US012742738B2

(12) United States Patent
Hill et al.

(10) Patent No.: US 12,742,738 B2
(45) Date of Patent: Sep. 22, 2026

(54) METHOD FOR DETECTING SOILING

(71) Applicant: BRAVE Analytics GmbH, Graz (AT)

(72) Inventors: Christian Hill, Graz (AT); Marko Simic, Graz (AT); Christian Neuper, Graz (AT); Michael Peinhopf, Graz (AT); Nikola Simic, Graz (AT)

(73) Assignee: BRAVE Analytics GmbH, Graz (AT)

( * ) Notice: Subject to any disclaimer, the term of this patent is extended or adjusted under 35 U.S.C. 154(b) by 60 days.

(21) Appl. No.: 18/994,719

(22) PCT Filed: Jun. 12, 2023

(86) PCT No.: PCT/AT2023/060183
§ 371 (c)(1), (2) Date: Jan. 15, 2025

(87) PCT Pub. No.: WO2024/016027
PCT Pub. Date: Jan. 25, 2024

(65) Prior Publication Data

US 2025/0362241 A1 Nov. 27, 2025

(30) Foreign Application Priority Data

Jul. 21, 2022 (AT) .............................. A 50549/2022

(51) Int. Cl.
*G01N 21/94* (2006.01)
*G01N 21/03* (2006.01)
(Continued)

(52) U.S. Cl.
CPC ............. *G01N 21/94* (2013.01); *G01N 21/05* (2013.01); *G01N 21/958* (2013.01); *G01N 2021/0389* (2013.01)

(58) Field of Classification Search
CPC ...... G01N 21/94; G01N 21/05; G01N 21/958; G01N 2021/0389
See application file for complete search history.

(56) References Cited

U.S. PATENT DOCUMENTS

2021/0285861 A1 9/2021 Hill

FOREIGN PATENT DOCUMENTS

DE 10 2017 204 037 9/2018
EP 1 096 248 5/2001
(Continued)

OTHER PUBLICATIONS

Int'l Search Report (SR) (Form PCT/ISA/210) conducted in Int'l Appln. No. PCT/AT2023/060183 (Sep. 13, 2023).
(Continued)

*Primary Examiner* — Jamil Ahmed
(74) *Attorney, Agent, or Firm* — GREENBLUM & BERNSTEIN, P.L.C.

(57) ABSTRACT

Method determining soiling of a side window of a chamber containing a sample with dispersed particles, which are irradiated with light through the chamber's inlet window. A force is exerted on the particles using the light, which influences movement of the particles dependent on particle size. Movement of the particles is detected by a camera based on a scattered light of the particles which passes through the side window. A size of the particles is ascertained via speed of the particles, after which a target scattered light intensity is calculated based on an intensity of light acting on the particles and ascertained size of the particles, and after which the target scattered light intensity is compared with a measured actual scattered light intensity and, based on a difference of the target scattered light intensity from the actual scattered light intensity, soiling of the side window is determined.

12 Claims, 1 Drawing Sheet

(51) Int. Cl.
*G01N 21/05* (2006.01)
*G01N 21/958* (2006.01)

(56) References Cited

FOREIGN PATENT DOCUMENTS

| | | | | |
|---|---|---|---|---|
| EP | 1 102 059 | | 5/2001 | |
| KR | 20190141440 | | 12/2019 | |
| KR | 20190141440 A | * | 12/2019 | ......... G01N 15/0211 |
| WO | 2019/002286 | | 1/2019 | |

OTHER PUBLICATIONS

Int'l Written Opinion (WO) (Form PCT/ISA/237) conducted in Int'l Appln. No. PCT/AT2023/060183 (Sep. 13, 2023).

* cited by examiner

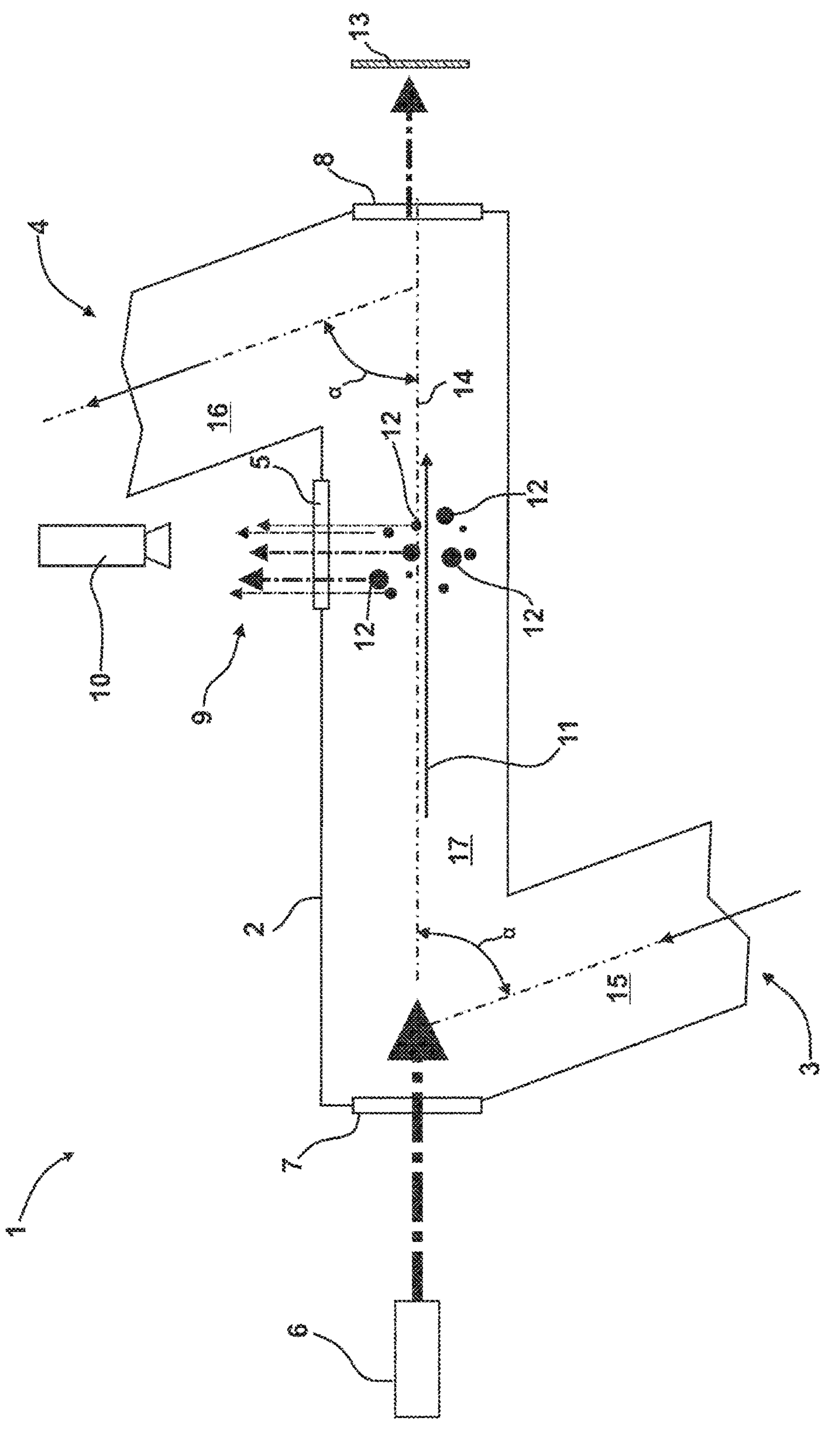
13
8
4
α
14
16
12
5
12
10
12
12
9
11
17
2
α
15
3
7
1
6

METHOD FOR DETECTING SOILING

The invention relates to a method for determining a soiling of a side window of a chamber containing a fluidic sample with dispersed particles.

The invention furthermore relates to a device for analyzing a fluidic sample with dispersed particles, comprising a chamber with a side window, an inlet window, a light source, in particular a laser, a camera with which scattered light passing through the side window can be detected, and a data processing device connected to the camera.

From the prior art, it has become known to analyze particles of a fluidic sample by means of optofluidic force induction, which is customarily denoted by OF2i, in that a force is applied to particles of a fluidic sample using a light source, typically using a laser, and a speed of the particles is measured, so that, based on the speed of the particles and on the known relation between an intensity of the light applied using the light source and the size of the particles, it is possible to deduce a particle size.

Furthermore, from the document EP 1 096 248 A2, a method for measuring a concentration of a solution has become known, wherein transmitted light intensities are measured. The document EP 1 102 059 A1 discloses a method for measuring a scattered light which arises when a light propagates through an inside of a solution that is to be detected. From the document DE 10 2017 204 037 A1, an optical sensor with a coating sensor has become known.

A method and a device of the type named at the outset have become known from the document WO 2019/002286 A1, for example. In a corresponding device, particles are moved with the fluidic sample through a chamber along a flow direction, wherein, roughly along the flow direction or opposite the flow direction, a force is applied to the particles in the flow direction or against the flow direction using a laser that is coupled to the chamber through a front window. A movement of the particles in the flow direction or opposite the flow direction is thereby detected through a side window of the chamber using a camera.

Through said side window, it is also possible to analyze other properties of the particles by means of spectroscopy.

It has been shown that, as the service life of the corresponding device increases, the side window becomes soiled due to the particles transported in the fluidic sample or the suspension, so that the quality of the spectroscopically ascertained data decreases.

This is addressed by the invention. The object of the invention is to specify a method with which a soiling of a corresponding side window can be determined in a simple manner. Via the soiling ascertained in such a manner, it is then possible either to correct a measurement result or to decide to clean the side window.

According to the invention, this object is attained with a method of the type named at the outset in which the particles are irradiated with light, in particular with a laser, through an inlet window of the chamber, wherein a force is exerted on the particles using the light, which force influences a movement of the particles that is dependent in particular on a size of the particles, wherein the movement of the particles is detected with a camera arranged outside of the chamber based on a scattered light of the particles which passes through the side window, wherein a size of the particles is ascertained via a speed of the particles, after which a target scattered light intensity is calculated based on an intensity of the light acting on the particles and the ascertained size of the particles, after which the target scattered light intensity is compared with a measured actual scattered light intensity and, based on a difference of the target scattered light intensity from the actual scattered light intensity, the soiling of the side window is determined.

In this case, in particular a liquid or a gas with particles distributed therein shall be understood as a fluidic sample with dispersed particles. Of course, the fluidic sample could also contain a corresponding mixture of a gas and a liquid with particles or could be composed of such a mixture.

The inventors have found that a target scattered light intensity can be directly derived via a speed of the particles and a known light intensity that acts on the particles, which target scattered light intensity indicates how intense the scattered light of the particles through the side window should be, so that a soiling of the side window directly results from the speed of the particles, the intensity of the light with which the particles are irradiated, and an actual scattered light intensity ascertained using the camera, for example, which actual scattered light intensity essentially corresponds to the target scattered light intensity attenuated by an intensity reduction caused by the soiling of the side window.

The soiling of the side window thus ascertained with high precision can subsequently be utilized to decide about a cleaning of the side window and/or to accordingly correct a measurement result that is acquired based on the scattered light passing through the side window, in particular a measurement result in relation to one or more properties of the particles, such as a composition, a weight, a size, and the like, for example.

It is possible to refer to methods known from the prior art to determine the particle size based on the light intensity acting on the particles and the speed of the particles. Normally, the fluidic sample is moved through the chamber. It shall be understood that, due to the light acting on the particles, the flow properties of the sample are also included in the evaluation of the movement of the particles in this case, so that a relative speed of the particles relative to the flow, for example, can then be relevant for an evaluation of a size of the particles.

It has proven effective that an intensity of the light coupled to the tube, in particular of a coupled laser, is continuously determined in order to calculate the target scattered light intensity based on said intensity. In this manner, an influence of a soiling of an inlet window, through which the laser is coupled to the chamber, can likewise be evaluated, so that a soiling of the side window can be determined in an even more exact manner.

It is particularly beneficial if the intensity is determined by means of a sensor which is arranged outside of the tube and which is struck by the light, in particular the laser, after said light has passed through the inlet window, the tube, and an outlet window opposite from the inlet window.

An intensity of the light emitted by the light source, in particular of a laser, which with the particles are irradiated in the chamber, is typically known, for example based on a rated power of the light source or of the laser. By detecting the intensity which the light or the laser still has after passing through the inlet window, the fluidic sample in the chamber, and the outlet window, it is possible to ascertain with very high accuracy a soiling of the inlet window and outlet window. Typically, the inlet window and outlet window are affected by a soiling to the same extent and optical properties of the sample are known, so that a soiling of the inlet window can be easily detected if a decrease in intensity of the light from the light source to the sensor is known. For this purpose, for example, the decrease in intensity attributable to the fluidic sample, typically a particle-containing fluid or a suspension, can be subtracted from a total decrease in intensity, and the remaining portion of the decrease in intensity can be equally allocated to the inlet window and outlet window in order to ascertain the soiling of these two windows.

The method according to the invention is preferably used in a method for analyzing a fluidic sample, in order to be able to obtain a high quality of analysis independently of a soiling of the side window. In this context, it is beneficial if, in a method for analyzing a fluidic sample with dispersed particles in a chamber with a side window, wherein a force is exerted on the particles using light, in particular using a laser, wherein a movement of the particles that is influenced by the force is detected through the side window by means of a camera and the particle size is determined based on the movement of the particles, a soiling of the side window is determined using a method according to the invention, and said soiling is taken into account in an analysis of the particles.

It is then possible, for example in an analysis of the actual scattered light intensity that is detected through the side window using the camera, to take into consideration that said actual scattered light intensity is already reduced by the soiling of the side window, so that said intensity would be higher by a determinable amount without the soiling of the side window. Accordingly, a correction factor that takes said soiling into account can be applied for a spectral analysis, for example. In addition, the method can, of course, also be carried out such that, at a certain degree of soiling that is ascertained using a method according to the invention, a cleaning of the side window is performed.

The method is preferably conducted such that a fluidic sample with particles that have a particle size of 20 nm to 500 nm is analyzed. The other features of the method can be embodied by analogous application of the teaching of the document WO 2019/002286 A1, which document is hereby incorporated in its entirety by way of reference.

It is preferably provided that the chamber has a cross section with an extension perpendicular to a flow direction of less than 10 mm, in particular 0.5 mm to 3 mm, although the method can, of course, also be implemented with larger or smaller chambers.

It is particularly beneficial if the chamber has a roughly circular cross section perpendicular to a flow direction. This results in particularly advantageous flow conditions. Along a flow direction, the chamber can have a cylindrical or even a conical or a constant or varying cross section.

In principle, the method can also be carried out with a fluidic sample that is at rest in the chamber. However, it is preferred that the method is used in order to analyze particles in a continuous process, wherein a suspension, or the sample that contains the particles, is moved through the chamber at a flow rate. In an evaluation of the size of the particles, the relative speed of the particles is then of course determined relative to the liquid, which relative speed is produced by the laser acting on the particles. In this context, it has proven particularly beneficial if the sample is moved through the chamber at a flow rate of 0.01 mm/s to 100 mm/s, in particular 0.2 mm/s to 10 mm/s.

The other object is attained according to the invention with a device of the type named at the outset which is embodied to carry out a method according to the invention. This is in particular the case if the data processing device is configured such that a target scattered light intensity is calculated and said intensity can be compared with a measured actual scattered light intensity in order to determine the soiling.

In a corresponding device, a pressure applying device is preferably provided with which the fluidic sample can be transported through the chamber at a flow rate of 0.01 mm/s to 100 mm/s, in particular 0.2 mm/s to 10 mm/s. Flow conditions beneficial for an exact measurement can thus be obtained. A size of the particles can then be ascertained via a difference between a speed of the particles and a speed of the fluidic sample inside of the chamber, which difference can be detected with the camera via the scattered light emitted by the particles.

It is beneficial if the inlet window is oriented roughly perpendicularly to a flow direction of the sample in a region of the side window. As a result, a particularly good coupling of the light, or of a laser, to the chamber is achieved in that region which is especially relevant for an analysis of the particles, that is, in the region of the inlet window.

In order to be able to determine a soiling of the inlet window in a particularly exact and simple manner, it is preferably provided that an outlet window opposite from the inlet window is provided, which outlet window is preferably roughly parallel to the inlet window.

The chamber can thus, for example, be embodied by a tube which comprises an inlet window and an outlet window parallel to the inlet window, wherein between the inlet window and outlet window an analysis segment of the tube is arranged with a tube axis that is typically perpendicular to the inlet window and outlet window, and which analysis segment comprises the side window through which particles located in said analysis segment of the tube can be detected with the camera, wherein the camera is preferably aligned with the analysis segment such that an optical axis of the camera is perpendicular to the tube axis in the analysis segment.

Adjacent to the inlet window, an inlet segment of the chamber formed by a tube or the like is normally provided, through which inlet segment the fluidic sample is guided into the analysis segment in which the analysis takes place. An axis of the inlet segment can, in principle, be oriented at any desired angle to the chamber or to the tube axis in the analysis segment, for example at an angle of approximately 60 degrees.

Adjacent to the outlet window, an outlet segment of the chamber formed by a tube or the like is typically provided, through which outlet segment the fluidic sample is guided out of the analysis segment after said sample has been analyzed. An axis of the outlet segment can, in principle, be aligned at any desired angle to the chamber or to a tube axis of the chamber in the analysis segment, for example at an angle of approximately 60 degrees.

Normally, the inlet segment and outlet segment are arranged at similar or identical angles relative to a tube axis or to the inlet window and outlet window, so that similar flow conditions and therefore a comparable soiling result in the region of the inlet window and outlet window. For this purpose, the inlet segment and outlet segment can have corresponding tubes, so that the shape of a Z results for the device, for example, wherein the inlet segment and outlet segment are typically parallel.

Typically, the laser is arranged such that it is configured to produce a laser beam which strikes the inlet window and outlet window perpendicularly. The laser beam is preferably roughly parallel to a tube axis or a flow direction of the fluid in the tube in the analysis segment. In principle, the laser beam could, of course, also be oriented at an angle other than 90 degrees to the inlet window and outlet window, for example at an angle of 30 degrees to 150 degrees.

In this context, it is particularly preferably provided that, outside of the chamber, a sensor is arranged for detecting an intensity of the light which has passed through the inlet window, the chamber, and the outlet window. Via an intensity of the light before the inlet window, which intensity is generally known, and the intensity of the light after passing through the inlet window, chamber, and outlet window, a degree of soiling of the inlet window and outlet window can then be easily determined. It is thereby generally assumed that the inlet window and outlet window are soiled to an approximately equal extent. An intensity attenuation in the region of the chamber due to the fluidic sample can be ascertained mathematically based on optical properties of the fluidic sample, which properties are typically also known.

It is particularly preferred if the chamber is embodied to be roughly symmetrical, so that a flow in the region of the outlet window is comparable to a flow in the region of the inlet window, in order to obtain a uniform soiling of the inlet window and outlet window.

Additional features, advantages, and effects of the invention follow from the exemplary embodiment described below. In the drawing which is thereby referenced:

FIG. 1 shows a device for carrying out a method according to the invention, in schematic view.

FIG. 1 shows a device 1 according to the invention for carrying out a method according to the invention, in schematic view. As shown, the device 1 comprises a chamber 2, inside of which a fluidic sample with particles 12 is moved along a flow direction 11 from an inlet 3 and to an outlet 4, for example at a speed of 1 mm/s.

The chamber 2 thereby comprises an inlet segment 15 connected to an inlet 3, an analysis segment 17 adjacent to the inlet segment 15, and an outlet segment 16 adjacent to the analysis segment 17 and connected to an outlet 4, so that the sample is transported through the chamber 2 from the inlet 3 through the inlet segment 15, the analysis segment 17, the outlet segment 16, and the outlet 4. The inlet segment 15, analysis segment 17, and outlet segment 16 can be formed by tubes, for example.

In the exemplary embodiment illustrated, longitudinal axes of the inlet segment 15 and outlet segment 16 are oriented at an angle α of approximately 60 degrees to a tube axis 14 of the analysis segment 17, so that the depicted shape of a horizontal Z results for the chamber 2. In principle, the inlet segment 15 and outlet segment 16 can be oriented at any desired, and possibly different, angles α to the analysis segment 17, although identical angles α are preferably chosen to obtain similar flow conditions.

To better illustrate the method according to the invention, the particles 12 are only depicted in a partial region of the chamber 2. It shall be understood, however, that said particles 12 are contained in the fluidic sample in a uniformly distributed manner, and thus that particles 12 are of course arranged in a distributed manner in the entire chamber 2.

A laser 6 can be coupled to the chamber 2 through an inlet window 7, with which laser 6 a force or a pulse can be applied to particles 12 in a fluidic sample located in the chamber 2.

As a result of a movement effected via said force or a change in movement of the particles 12 in the chamber 2, it is possible to deduce a size of the particles 12, since the pulse applied to the particles 12, and therefore a movement of the particles 12 relative to the fluid, is dependent on a size of the particle 12 and an intensity of the laser 6 or light acting on the particles 12.

In order to be able to detect a movement or a change in movement of the particles 12, a side window 5 is provided in the analysis segment 17 of the chamber 2, which in this case is formed by a tube, through which side window 5 a movement of the particles 12 can be detected with a camera 10 arranged outside of the chamber 2 via a scattered light 9 which the particles 12 transmit to the camera 10 through the side window 5. The side window 5 is arranged in the analysis segment of the tube, which segment is arranged between the inlet window 7 and outlet window 8. In said analysis segment, a tube axis 14 is also perpendicular to the inlet window 7 and outlet window 8.

As can be seen, the camera 10 is aimed at the side window 5 such that an optical axis of the camera 10 is roughly perpendicular to the tube axis 14 in the analysis segment of the tube behind the side window 5. A movement of the particles 12 along the tube axis 14 or along a flow direction 11 of the fluid in said analysis segment can thus be detected essentially free of distortion using the camera 10.

An actual scattered light intensity of the scattered light 9 of the individual particles 12 that passes through the side window 5 can thus be detected using the camera 10. Furthermore, a speed of the individual particles 12 can also be detected using the camera 10, which speed is represented on a sensor 13 of the camera 10 by a change of individual points of light or streaks of light.

Thus, if the intensity of the light that acts on the particles 12 is known, it is possible to deduce the size of the particles 12 via the speed of the individual particles 12. The size of said particles 12 in combination with the intensity of the light acting on the particles 12, or of the laser 6, in turn allows the calculation of a target scattered light intensity, that is, of an intensity of the light that radiates onto the side window 5 from the particles 12.

The difference between this target scattered light intensity and the actual scattered light intensity increases with an increasing soiling of the side window 5, so that it is possible to deduce the soiling via the target scattered light intensity and the actual scattered light intensity with a data processing device of the device 1, which data processing device is connected to the camera 10.

This knowledge about the soiling of the side window 5 can in turn be utilized to obtain a high quality of an analysis of the particles 12 independently of a soiling of the side window 5.

In order to be able to determine in a particularly exact manner the intensity of the light or of the laser 6 that acts on the particles 12, an outlet window 8 is provided opposite from the inlet window 7, behind which outlet window 8 a sensor 13 is then arranged, with which sensor 13 an intensity of the light that has passed through the inlet window 7, the chamber 2, and therefore the fluidic sample arranged therein, and the outlet window 8 can be determined.

A difference in the intensity of the light emitted by the laser 6 and the light measured using the sensor 13, or the intensity of the laser beam after passing through the inlet window 7, chamber 2, and outlet window 8, can essentially be divided into three loss sources, namely: first, a loss due to a soiling of the inlet window 7; second, a loss due to an intensity attenuation in the region of the chamber 2 as a result of the fluidic sample; and third, an intensity loss due to a soiling of the outlet window 8. A soiling by the fluidic sample in the chamber 2 can be calculated in a relatively exact manner, especially since optical properties of the sample are well known as a general rule. In a device 1 embodied according to the invention, a remaining difference in the light intensity is equally divided between the inlet window 7 and outlet window 8, so that a soiling of the inlet window 7 and of the outlet window 8 can also be determined well, which soiling is, similarly to the soiling of the side window 5, typically dependent on a service life and increases with an increasing service life, since particles 12 accumulate on the windows.

For this purpose, the device 1 is typically embodied to be roughly symmetrical, so that flow conditions in the region of the inlet window 7 correspond to flow conditions in the region of the outlet window 8, and a roughly synchronous soiling of the inlet window 7 and outlet window 8 occurs. In the exemplary embodiment shown, the inlet window 7 and the outlet window 8 are for this purpose arranged roughly parallel, and perpendicularly to a flow direction 11 of the fluidic sample in the chamber 2 in the region of the side window 5. This furthermore enables a beneficial transmission of the light from the laser 6 into the chamber 2. The laser 6 thus strikes the inlet window 7 and outlet window 8 roughly perpendicularly in this case.

With a method according to the invention and a device 1 embodied for this purpose, a soiling of a window can be detected in a particularly simple and, at the same time, highly exact manner in what is referred to as an OF2i method, in order to be able to obtain a high analysis quality independently of a soiling.

The invention claimed is:

1. A method for determining a soiling of a side window of a chamber containing a fluidic sample with dispersed particles, wherein the particles are irradiated with light, in particular with a laser, through an inlet window of the chamber, wherein a force is exerted on the particles using the light, which force influences a movement of the particles that is dependent in particular on a size of the particles, wherein the movement of the particles is detected with a camera arranged outside of the chamber based on a scattered light of the particles which passes through the side window, wherein a size of the particles is ascertained via a speed of the particles, after which a target scattered light intensity is calculated based on an intensity of the light acting on the particles and the ascertained size of the particles, after which the target scattered light intensity is compared with a measured actual scattered light intensity and, based on a difference of the target scattered light intensity from the actual scattered light intensity, the soiling of the side window is determined.

2. The method according to claim 1, wherein an intensity of the light coupled to the tube, in particular of a coupled laser, is continuously determined in order to calculate the target scattered light intensity based on said intensity.

3. The method according to claim 2, wherein the intensity is determined by a sensor which is arranged outside of the tube and which is struck by the light, in particular the laser, after said light has passed through the inlet window, the tube, and an outlet window opposite from the inlet window.

4. A method for analyzing a fluidic sample with dispersed particles in a chamber with a side window, wherein a force is exerted on the particles using light, in particular using a laser, wherein a movement of the particles that is influenced by the force is detected through the side window by a camera and the particle size is determined based on the movement of the particles, wherein a soiling of the side window is determined using a method according to claim 1, and said soiling is taken into account in an analysis of the particles.

5. The method according to claim 4, wherein a fluidic sample with particles that have a particle size of 20 nm to 500 nm is analyzed.

6. The method according to claim 1, wherein the chamber has a cross section with an extension perpendicular to a flow direction of less than 10 mm, in particular 0.5 mm to 3 mm.

7. The method according to claim 1, wherein the sample is moved through the chamber at a flow rate of 0.01 mm/s to 100 mm/s, in particular 0.2 mm/s to 10 mm/s.

8. A device for analyzing a fluidic sample with dispersed particles, comprising a chamber with a side window, an inlet window, a light source, in particular a laser, a camera with which scattered light passing through the side window can be detected, and a data processing device connected to the camera, wherein the device is configured to carry out a method according to claim 1.

9. The device according to claim 8, wherein a pressure applying device is provided with which the fluidic sample can be transported through the chamber at a flow rate of 0.01 mm/s to 100 mm/s, in particular 0.2 mm/s to 10 mm/s.

10. The device according to claim 8, wherein an outlet window opposite from the inlet window is provided, which outlet window is preferably roughly parallel to the inlet window.

11. The device according to claim 8, wherein, outside of the chamber, a sensor is arranged for detecting an intensity of the light which has passed through the inlet window, the chamber, and an outlet window.

12. The device according to claim 8, wherein the chamber is embodied to be roughly symmetrical, so that a flow in the region of the outlet window is comparable to a flow in the region of the inlet window, in order to obtain a uniform soiling of the inlet window and outlet window.

* * * * *